(12) United States Patent
Miura et al.

(10) Patent No.: US 6,435,233 B1
(45) Date of Patent: Aug. 20, 2002

(54) FUEL FEEDING APPARATUS

(75) Inventors: Natsushi Miura; Hisatsugu Goto; Tomokazu Hori, all of Aichi-ken (JP)

(73) Assignee: Toyoda Gosei Co., Ltd., Aichi-Ken (JP)

( * ) Notice: Subject to any disclaimer, the term of this patent is extended or adjusted under 35 U.S.C. 154(b) by 0 days.

(21) Appl. No.: 09/949,037

(22) Filed: Sep. 10, 2001

(30) Foreign Application Priority Data

Sep. 20, 2000 (JP) ........................................ 2000-285576

(51) Int. Cl.[7] ............................. B65B 1/04; B65B 3/00; B67C 3/00
(52) U.S. Cl. ..................... 141/390; 141/97; 141/332; 141/339; 296/97.22; 220/86.2
(58) Field of Search ........................... 141/97, 98, 114, 141/312, 332, 339, 390; 296/97.22, 1.1; 220/86.2; 280/834, 853; 137/351

(56) References Cited

U.S. PATENT DOCUMENTS

| | | | | |
|---|---|---|---|---|
| 4,573,694 A | * | 3/1986 | Goto et al. ................... 280/5 |
| 5,090,760 A | * | 2/1992 | Wheeler ..................... 296/1.1 |
| 5,118,155 A | * | 6/1992 | Koop ......................... 296/1.1 |
| 6,033,006 A | * | 3/2000 | Bovellan et al. .......... 296/97.22 |

FOREIGN PATENT DOCUMENTS

JP                58067521           4/1983

* cited by examiner

*Primary Examiner*—Timothy L. Maust
(74) *Attorney, Agent, or Firm*—Pillsbury Winthrop LLP (57) ABSTRACT

An inlet filler pipe comprises a pipe main body having a fuel passage for fueling fuel through an inlet into a fuel tank, and a flange formed on the pipe main body, for attachment to an outer wheel housing. A reinforcing element comprising a plurality of first ribs and second ribs arranged so as to surround the pipe main body is formed on the flange. The portion along the outer periphery of the pipe main body between first ribs and second ribs serves as a fragile portion, ensuring breaks at a load over a predetermined level.

10 Claims, 7 Drawing Sheets

FUEL FEEDING APPARATUS

CROSS REFERENCE TO RELATED APPLICATIONS

This application claims the benefit of and priority from Japanese Application No. 2000-285576 filed Sep. 20, 2000, the content of which is incorporated herein by reference.

BACKGROUND OF THE INVENTION

1. Field of the Invention

The present invention relates to a fuel feeding apparatus for fueling a fuel tank, and in particular relates to a mechanism which is configured to be broken by external force.

2. Description of Related Art

Figure 11:
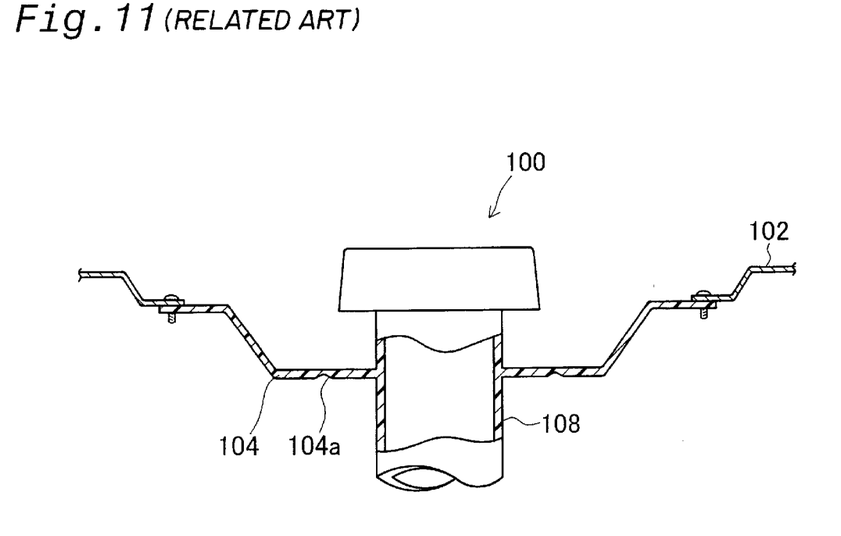
FIG. 11 is an illustration of the structure of a fuel dispensing inlet in conventional art.

Vehicle fuel dispensing inlet mechanism of this kind are known in the art, being described in JP 58-67521A. FIG. 11 is an illustration of the structure. The fuel dispensing inlet mechanism comprises a filler base 104 attached to the vehicle's outer panel (attachment member of the vehicle) around the fueling inlet 100, and a fuel dispensing tube 108 (pipe main body), which is integrally formed with the bottom of the filler base 104 and leads fuel into the fuel tank. A V-shaped groove 104a disposed along an outer periphery of the fuel dispensing tube 108 is formed at a bottom of the filler base 104. The groove 104a is an easy-break portion where the fuel dispensing tube 108 is separated from the filler base 104 when a load beyond a predetermined level is applied to the filler base 104 due to loads such as from vehicle collisions.

However, even though the structure is broken at the groove 104a in the conventional art, the breaking load varies considerably depending on the depth of the groove 104a or slight variations in the shape. It is thus essential to strictly control differences in the shape, dimensions, and the like of the groove 104a in order to ensure breaks beyond a predetermined load.

SUMMARY OF THE INVENTION

The object of the present invention is to provide a fuel feeding apparatus which ensures that a pipe main body is configured to be separated from an attachment member of a vehicle by loads beyond a predetermined level such as in collisions.

In order to attain at least part of the above and other related objects of the present invention, there is provided a fuel feeding apparatus configured to be attached to an attachment member on the side of a vehicle in order to introduce fuel into a fuel tank. The fuel feeding apparatus for a fuel tank comprises an inlet filler pipe including a pipe main body having an inlet and a fuel passage for fueling through the inlet into the fuel tank, and a pipe attachment secured to the pipe main body, for attachment to a vehicle attachment member. The pipe attachment comprises a reinforcing element with a plurality of ribs arranged so as to surround the pipe main body. The pipe attachment comprises a fragile portion around the pipe main body proximate ends of the plurality of ribs.

When load over a predetermined level results in the separation of the pipe attachment from the vehicle attachment member in rear-end collisions, the fragile portion breaks before the inlet filler pipe part breaks, thereby disengaging the vehicle attachment member and the pipe main body. That is, the fragile portion is formed along ends of the plurality of ribs disposed so as to surround the pipe main body, so that the significant difference in mechanical strength from portions without ribs ensures easier breakage at the fragile portion. External force exerted on the pipe main body can thus be moderated, even when substantial external force is exerted on the vehicle attachment member.

In preferred embodiments of the invention, various configurations can be adopted in consideration of the mechanical strength or the method for forming the pipe attachment, such as configurations in which the ribs are disposed radially centered around an axis of the pipe main body or are disposed in horizontal symmetry centered around the axis of the pipe main body.

A preferred embodiment of the reinforcing element will comprise a first rib group comprising first ribs disposed on a first surface and a second rib group comprising second ribs disposed on a second surface, the fragile portion being disposed along the circled portion between the first and second ribs.

Various structures can be adopted to ensure breakage at a predetermined load at the fragile portion. That is, the reinforcing element can be formed in such a way that the reinforcing element comprises reinforcing plates, the reinforcing plates sandwiching the ribs with hollow portions between the ribs each other. This can increase the difference in mechanical strength between the fragile portion and the rest of the pipe attachment, and can reduce the weight of the apparatus.

The pipe attachment can also be formed thinner toward the fragile portion.

Other preferred embodiments of the fragile portion is constructed and arranged to be a portion where the pipe attachment curves around the pipe main body, the portion receiving the maximum moment when the external force is applied to the attachment member.

These and other objects, features, aspects, and advantages of the present invention will become more apparent from the following detailed description of the preferred embodiments with the accompanying drawings.

DETAILED DESCRIPTION OF PREFERRED EMBODIMENTS

Figure 1:
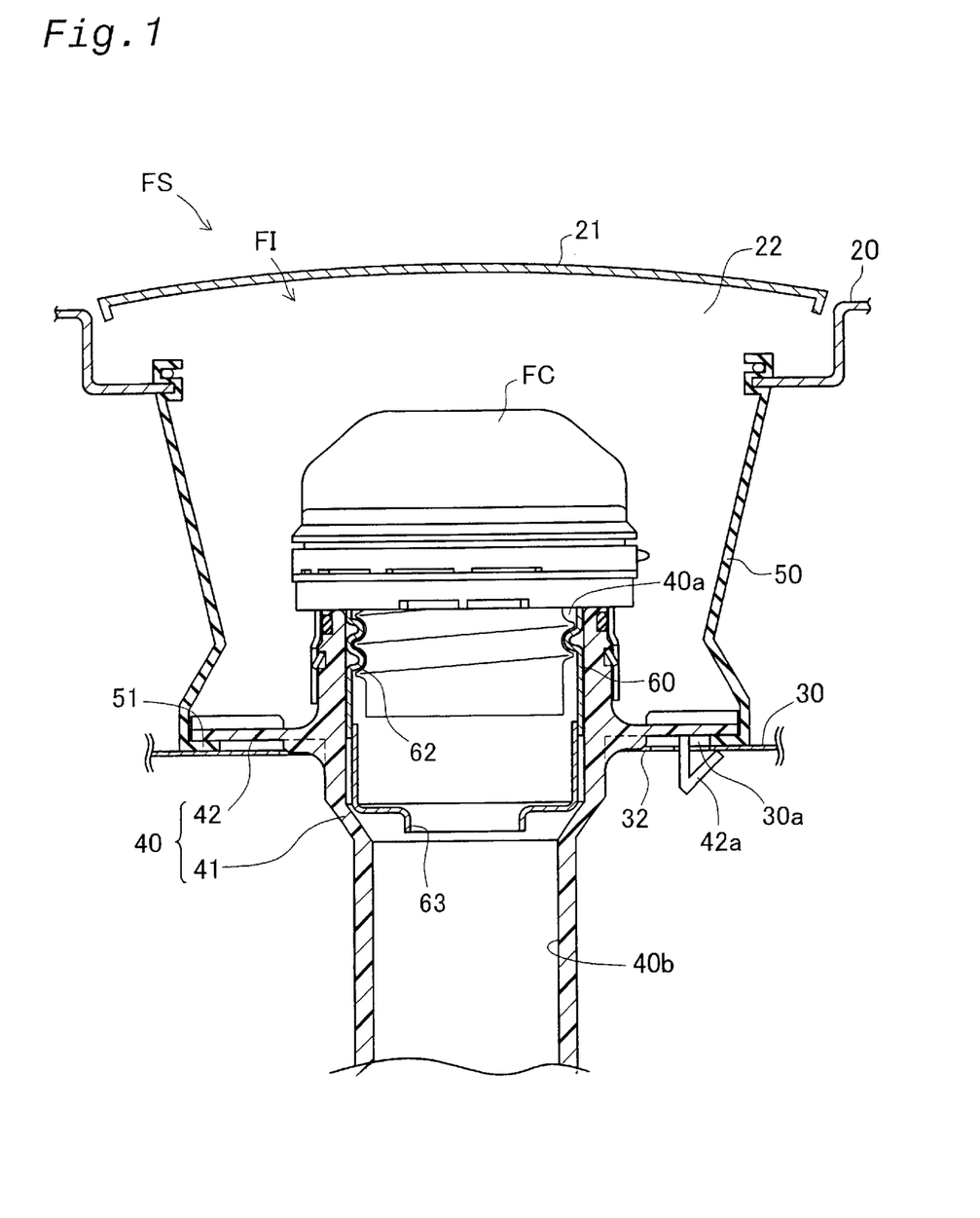
FIG. 1 is a cross sectional view illustrating a fueling mechanism for dispensing fuel into a fuel tank of a vehicle.

FIG. 1 is a cross sectional view illustrating a fueling mechanism FS for dispensing fuel into a fuel tank of a vehicle. The fueling mechanism FS is connected to the fuel tank from a fueling component FI attached to an outer wheel housing 30 (vehicle attachment member) and outer side member 20 forming an outer panel of the vehicle. The fueling mechanism FS comprises a fuel cap FC, an inlet filler pipe 40, and a seal cap 50. A fuel port 22 opened and closed by a fueling lid 21 is formed in the outer side member 20. The seal cap 50 seals the area around the fuel cap FC in a space between the outer side member 20 and the outer wheel housing 30.

In the fueling mechanism FS, when the fueling lid 21 and fuel cap FC are opened and the fuel is dispensed from the fueling gun (not shown) into the inlet filler pipe 40, the fuel is fed through the inlet filler pipe 40 into the fuel tank.

The structure of the various parts of the fueling mechanism FS are described below. The inlet filler pipe 40 comprises a pipe main body 41 and a flange 42 (pipe attachment) integrally formed around the pipe main body 41, the flange 42 and pipe main body 41 being made of fuel resistant resin material. The pipe main body 41 has a dispensing inlet 40a disposed inside the fueling port 22, and a fuel passage 40b for dispensing fuel through the dispensing inlet 40a into the fuel tank. The flange 42 extends from an outer wall of the pipe main body 41 to shape a disk, and is attached to an opening 32 of the outer wheel housing 30 with one end of the seal cap 50 interposed therebetween.

Three elastically engageable catches 42a are formed at an interval on a circumference of the flange 42. The catches 42a are pressed into attachment holes 30a in the outer wheel house 30 to secure the flange 42 to the outer wheel housing 30 and to secure the bottom 51 of the seal cap 50.

A connector 60 is mounted on an upper inside wall of the inlet filler pipe 40. The connector 60 is metal and cylindrical member for detachably mounting the fuel cap FC. Threading 62 for stopping the fuel cap FC is formed on an inner wall of the connector 60. A positioning projector 63 for positioning the fueling gun inserted during fueling is formed at a bottom of the connector 60.

Figure 2:
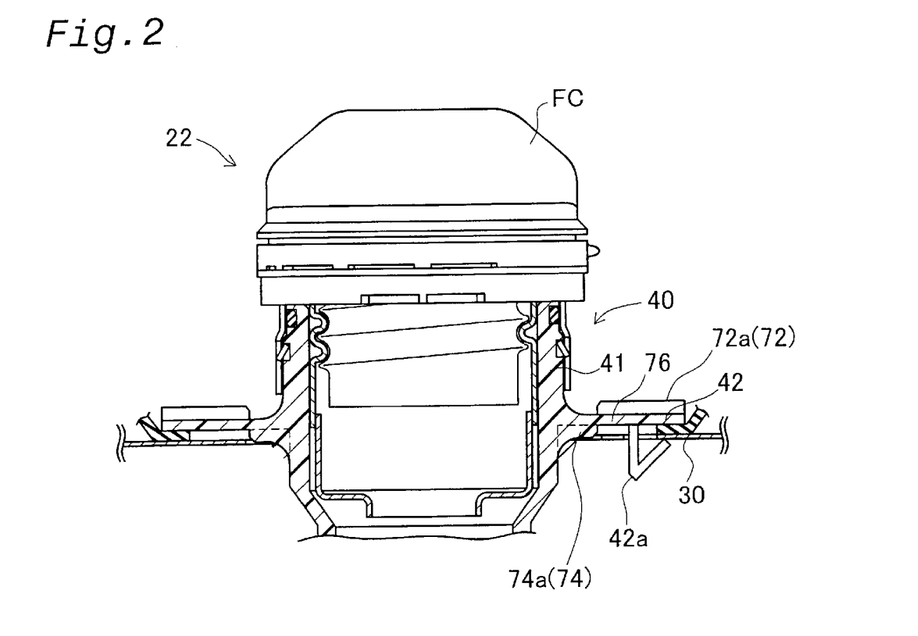
FIG. 2 is a cross sectional view illustrating a vicinity around a flange of an inlet filler pipe.
Figure 3:
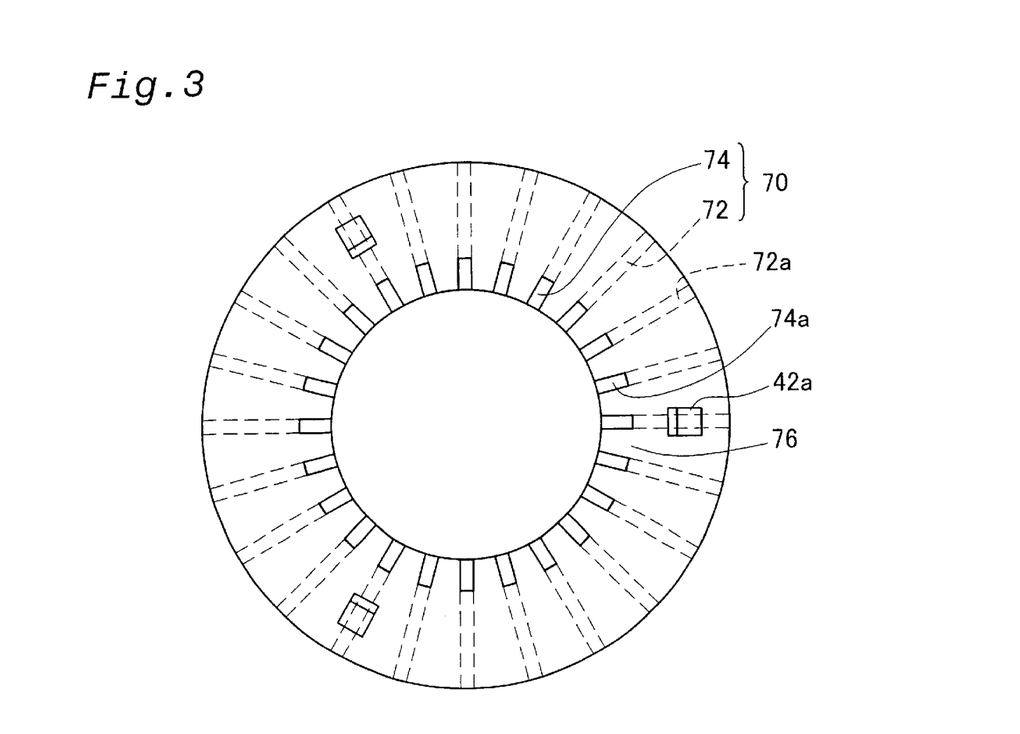
FIG. 3 is view of the flange as seen from below.

FIG. 2 is a cross sectional view illustrating a vicinity of the flange 42 of the inlet filler pipe 40, and FIG. 3 is a view of the flange 42 as seen from below. In FIGS. 2 and 3, a reinforcing element 70 is formed on an external and internal surfaces of the flange 42. The reinforcing element 70 comprises a first rib group 72 including first ribs 72a disposed on the external surface which is the fuel port 22 side of the flange 42, and a second rib group 74 including second ribs 74a disposed on the internal surface which is the fuel tank side of the flange 42. The first ribs 72a are arranged to be centered around an axis of the pipe main body 41, the inner peripheral ends of the firs ribs 72a being disposed on circle at a predetermined distance from the outer periphery of the pipe main body 41. The second ribs 74a, which are disposed radially and centered around the axis of the pipe main body 41, are disposed on the inner peripheral side from the first ribs 72a. The outer peripheral ends of the second ribs 74a are disposed circumferentially in alignment with the inner peripheral ends of the first ribs 72a. A fragile portion 76 is formed between the inside ends of the first ribs 72a and the outside ends of the second ribs 74a. The fragile portion 76 is formed between the mechanically reinforced first rib group 72 and second rib group 74, serving as the easy-break portion.

When a load over a predetermined level causes the outer wheel housing 30 and the flange 42 to separate by a vehicle collisions, the fragile portion 76 breaks before the inlet filler pipe 40 breaks, disengaging the outer wheel housing 30 and pipe main body 41. That is, the reinforcing element 70 is formed in such a way that the inner peripheral ends of the plurality of first ribs 72a and the external peripheral ends of the second ribs 74a surround the pipe main body 41, so the fragile portion 76 will be certain to break more easily because of the substantial difference in mechanical strength relative to the reinforcing element 70. External force exerted on the inlet filler pipe 40 can thus be moderated, even when substantial external force is exerted on the outer wheel housing 30.

Because the reinforcing element 70 is formed with the first ribs 72a and second ribs 74a protruding from the surface of the flange 42, it is easier to control the intersecting dimensions and the shape of the ribs with fewer changes in breaking load than when a V-shaped groove is formed in the flange, as described in the prior art.

Figure 4:
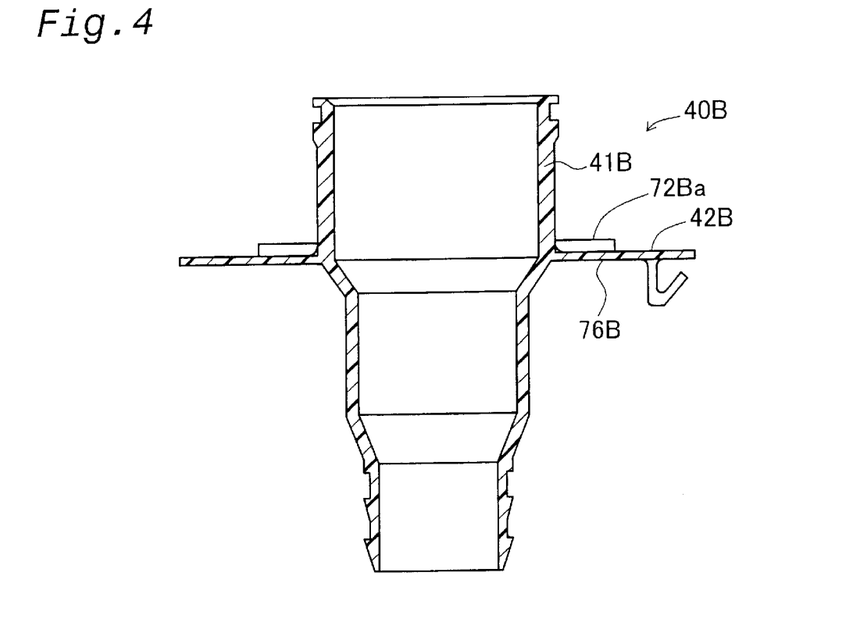
FIG. 4 is a cross sectional view illustrating a fuel feeding apparatus in a second embodiment.
Figure 5:
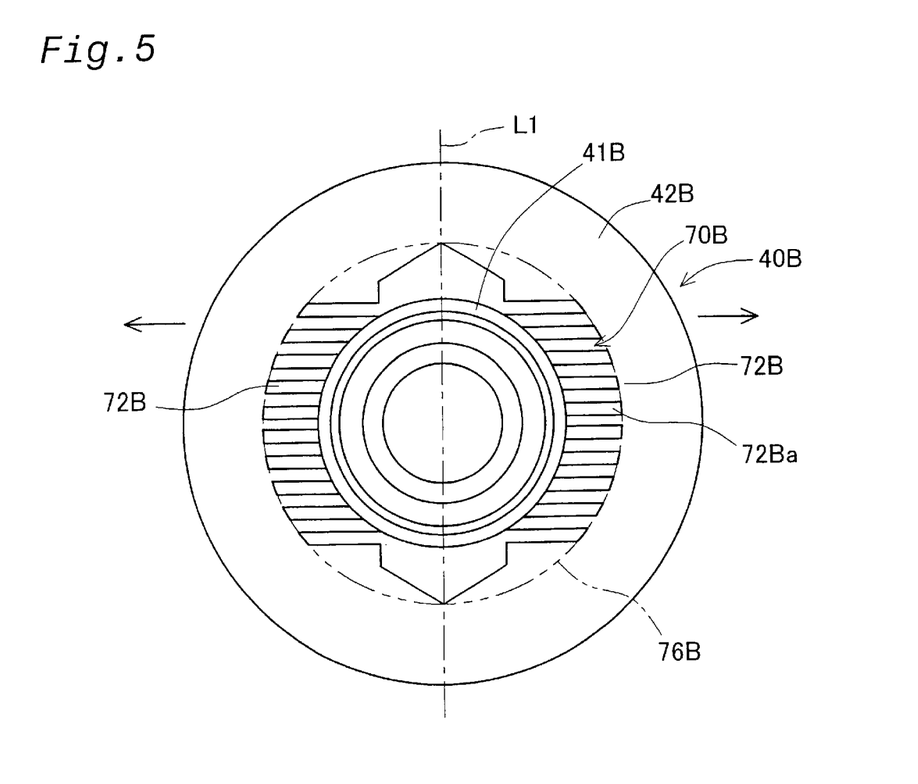
FIG. 5 is a view of the flange of the inlet filler pipe in FIG. 4 as seen from above.

FIG. 4 is a cross sectional view illustrating a fuel feeding apparatus in a second embodiment, and FIG. 5 is a view of a flange 42B of an inlet filler pipe 40B as seen from above. A reinforcing element 70B in the second embodiment is characterized in that ribs 72Ba are disposed in parallel horizontal symmetry centered on the external surface of the flange 42B. That is, a rib group 72B comprising the disposal of a plurality of ribs 72Ba is formed on the outer peripheral side of a pipe main body 41B, being the upper surface of the flange 42B. The ribs 72Ba are disposed in parallel horizontal symmetry centered around the axis of symmetry L1 in FIG. 5. A fragile portion 76B is formed along the outer peripheral end of the reinforcing element 70B. The fragile portion 76B is mechanically weaker than the reinforcing element 70B, and the concentration of stress can cause the fragile portion 76B to be broken at a load over a predetermined level.

Since the ribs 72Ba are formed in horizontal symmetry centered around the axis of symmetry L1, parts of the mold can be left out in the direction of the arrow to make a simpler shape when the inlet filler pipe 40B is formed by injection molding.

Figure 6:
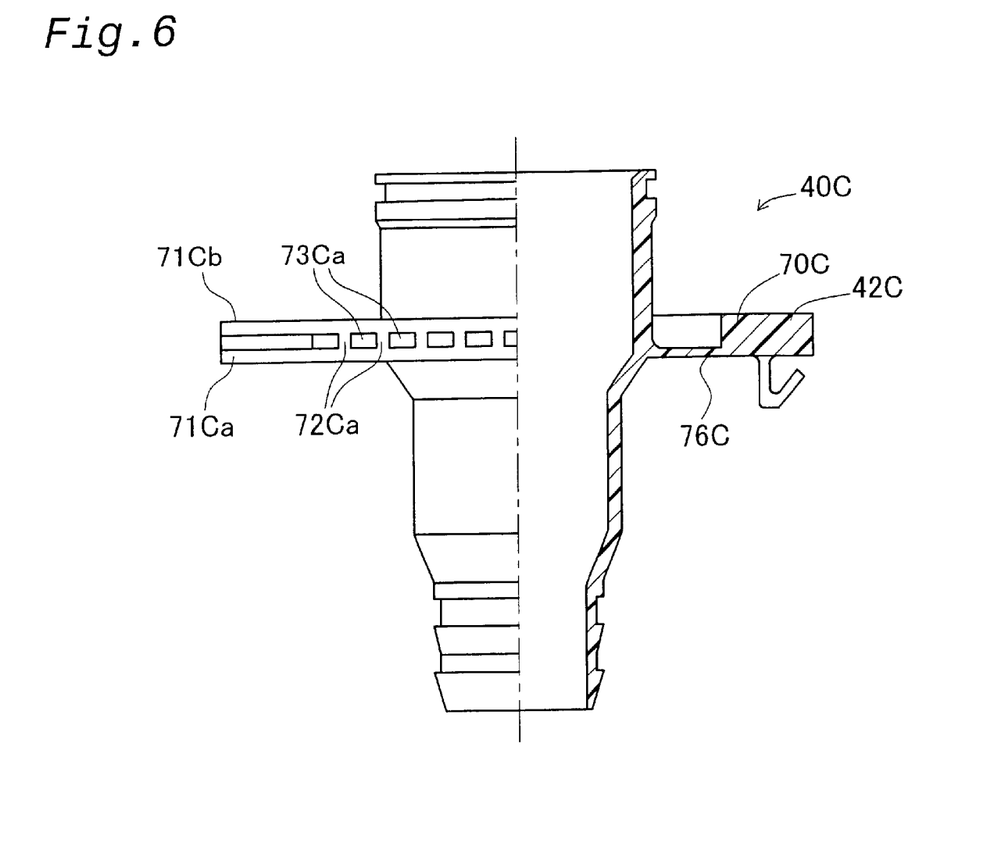
FIG. 6 is a semi-cross sectional view illustrating a fuel feeding apparatus in a third embodiment.
Figure 7:
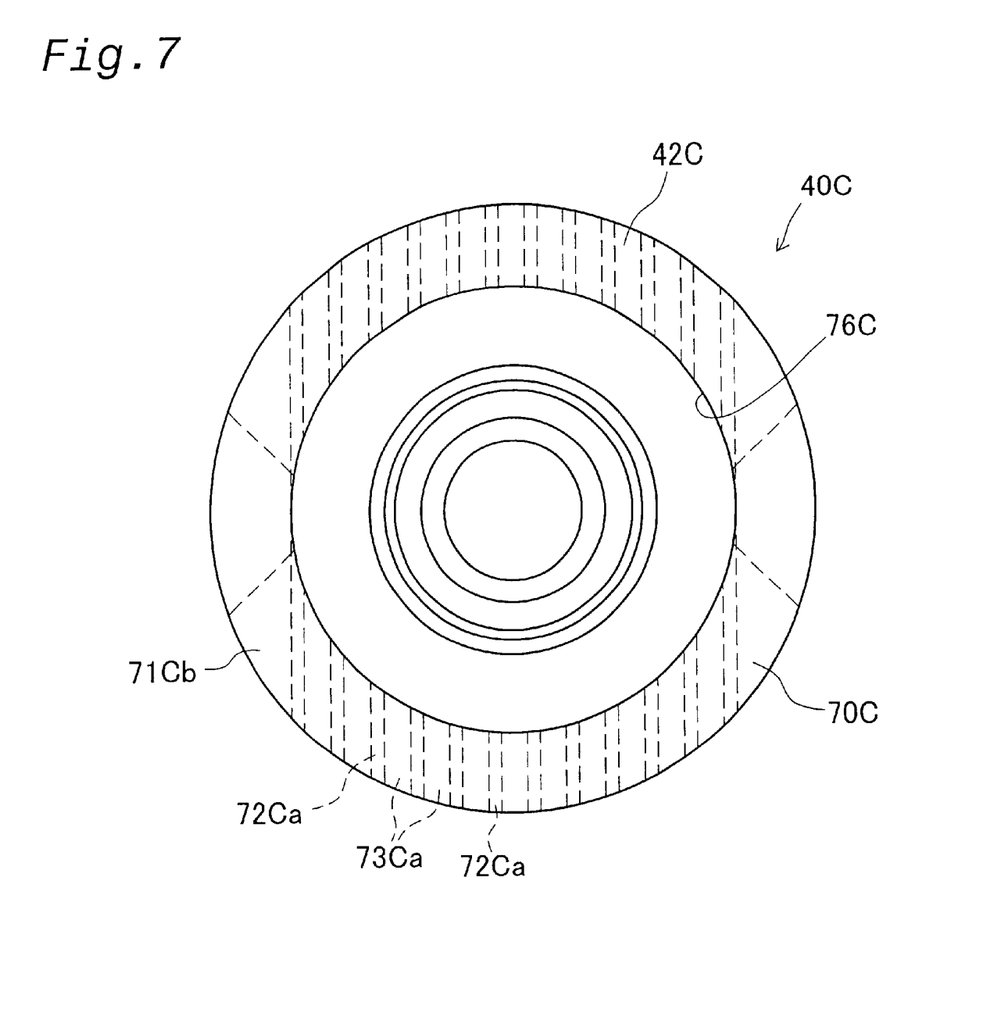
FIG. 7 is view of the flange of an inlet filler pipe in FIG. 6 as seen from below.

FIG. 6 is a semi-cross sectional view illustrating a fuel feeding apparatus in a third embodiment, and FIG. 7 is a view of a flange 42C of an inlet filler pipe 40C as seen from above. A reinforcing element 70C in the third embodiment is characterized by a difference in mechanical strength relative to a fragile portion 76C. That is the reinforcing element 70C is formed on the outer periphery of the flange 42C, and the fragile portion 76C is formed along the inner peripheral edge of the reinforcing element 70C. The reinforcing element 70C is constructed so that ribs 72Ca are connected in parallel by a lower plate 71Ca and an upper plate 71Cb. Vacancies 73Ca are formed between the ribs 72Ca to reduce the weight of the reinforcing element 70C.

In the third embodiment, the mold shape can be simplified in the same manner as in the second embodiment by leaving out the part of the molds in the vertical direction in FIG. 7, and the difference in mechanical strength between the reinforcing element 70C and flange 42C can be increased to ensure more reliable breakage.

Figure 8:
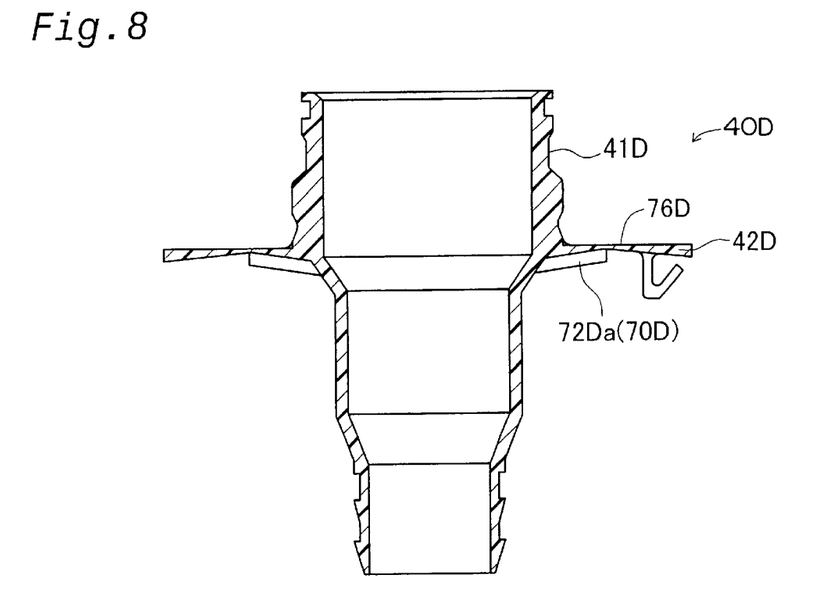
FIG. 8 is a cross sectional view illustrating a fuel feeding apparatus in a fourth embodiment.

FIG. 8 is a cross sectional view illustrating a fuel feeding apparatus in a fourth embodiment. The fourth embodiment is characterized in that a flange 42D formed on the outer periphery of an inlet filler pipe 40D is thinner along a fragile portion 76D. That is, ribs 72Da forming a reinforcing element 70D protrude on the inner periphery side of the inner surface of the flange 42D. The fragile portion 76D is formed along the outer peripheral end of the ribs 72Da. The flange 42D is also formed thinner toward the fragile portion 76D.

In the fourth embodiment, the fragile portion 76D is thin, and the mechanical strength on the outer peripheral side of the flange 42D is higher, allowing stress to be more readily concentrated and ensuring a more reliable break.

Figure 9:
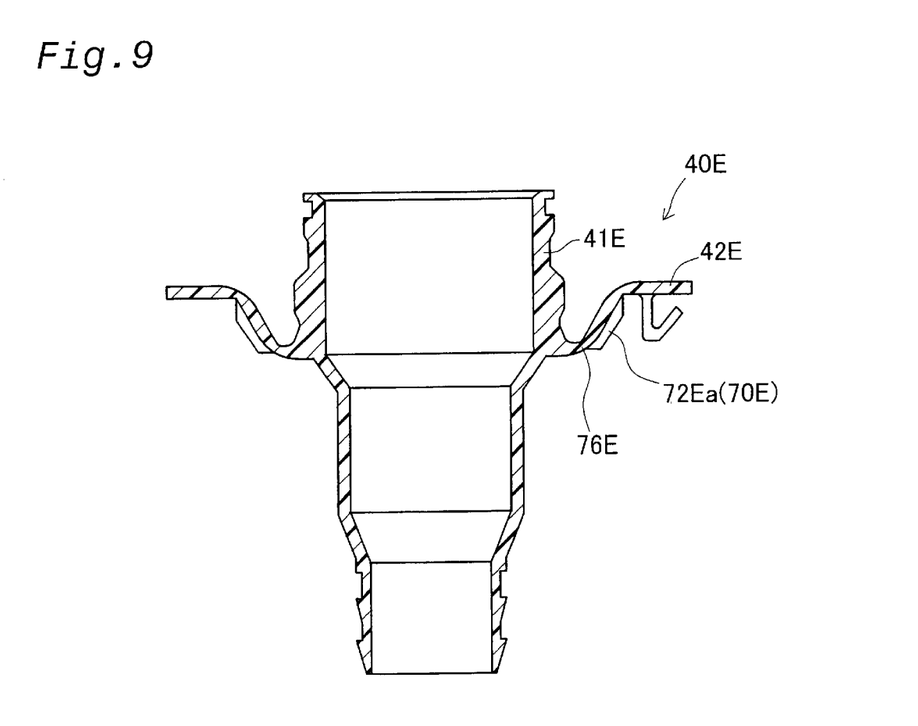
FIG. 9 is a cross sectional view illustrating a fuel feeding apparatus in a fifth embodiment.
Figure 10:
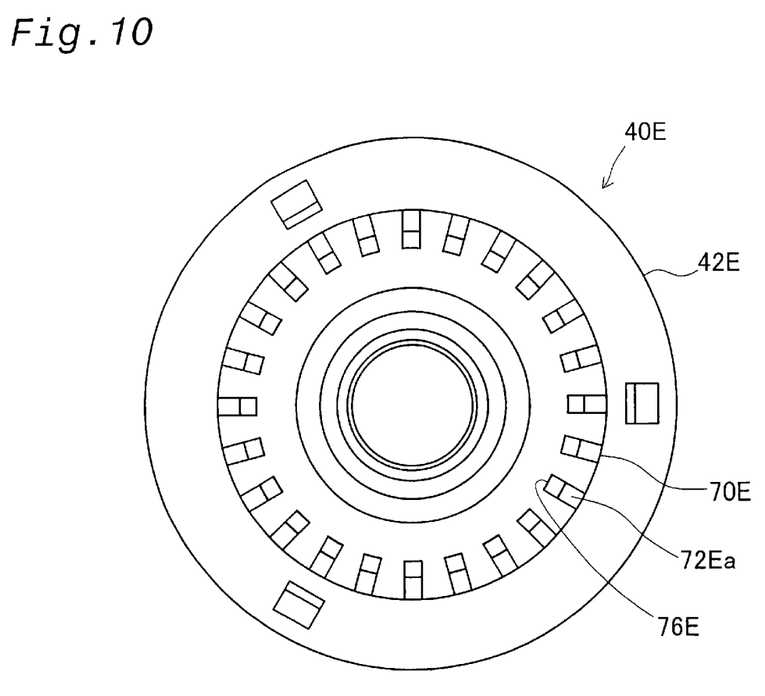
FIG. 10 is a view of the flange of the inlet filler pipe.

FIG. 9 is a cross sectional view illustrating a fifth embodiment of the fuel feeding apparatus, and FIG. 10 is a view of a flange 42E of an inlet filler pipe 40E as seen from below. The flange 42E in the fifth embodiment is characterized by being in funnel-shaped. That is, the flange 42E is in the form of a funnel that is concave toward the fuel tank, and a reinforcing element 70E including ribs 72E*a* is formed on the lower surface of the flange 42E. A fragile portion 76E is formed on the bottom of the flange 42E, being the inner peripheral end of the ribs 72E*a*.

When the fifth embodiment is subject to external force from the outer wheel housing, maximum moment is applied to the bottom of the flange 42E, and stress is concentrated on the fragile portion 76E, which has low mechanical strength, thus ensuring a reliable break.

The present invention is not limited to the above embodiments, and is capable of various other modifications within the scope of the invention. Examples are given below.

(1) The reinforcing element formed on the flange 42 may be formed on both sides of the flange, but may also be formed on only one side such that the fragile portion is suitably formed. The ribs may be formed protruding at the same width, but the width of the ribs may be increases toward the fragile portion to increase differences in mechanical strength.

(2) As means for attaching the inlet filler pipe to the vehicle attachment member, tightening means such as bolts may be used instead of the catches integrally formed with the flange as described above.

The scope and spirit of the present invention are limited only by the terms of the appended claims.

What is claimed is:

1. A fuel feeding apparatus configured to be attached to an attachment member of a vehicle, for leading a supply of fuel to a fuel tank, the fuel feeding apparatus comprising:

an inlet filler pipe including a pipe main body and a pipe attachment, the pipe main body having an inlet and a fuel passage for leading fuel from the inlet to the fuel tank, the pipe attachment secured to the pipe main body for attaching the pipe main body to the attachment member;

wherein the pipe attachment comprises a reinforcing element with a plurality of ribs surrounding the pipe main body, the ends of the rib are disposed on a circle at a predetermined distance from a periphery of the pipe main body and a fragile portion is formed around the pipe main body proximate the circle.

2. The fuel feeding apparatus according to claim 1, wherein the ribs are disposed radially and centered on an axis of the pipe main body.

3. The fuel feeding apparatus according to claim 1, wherein the ribs are disposed in horizontal symmetry in relation to an axis of the pipe main body.

4. The fuel feeding apparatus according to claim 1, wherein the pipe attachment has a first surface and a second surface, and the reinforcing element comprises a first rib group including first ribs disposed on the first surface, and a second rib group including second ribs disposed on the second surface, the fragile portion formed in a circular shape between the first ribs and second ribs.

5. The fuel feeding apparatus according to claim 1, wherein the reinforcing element further comprises reinforcing plates sandwiching the plurality of ribs with hollow portions between the ribs.

6. The fuel feeding apparatus according to claim 1, wherein the pipe attachment has an attachment main body and the fragile portion, the fragile portion being formed thinner than the attachment main body.

7. The fuel feeding apparatus according to claim 1, wherein the fragile portion is constructed and arranged to be a portion where the pipe attachment curves around the pipe main body, the fragile portion receiving a maximum moment when an external force is applied to the attachment member.

8. The fuel feeding apparatus according to claim 2, wherein the pipe attachment has a first surface and a second surface, and the reinforcing element comprises a first rib group including first ribs disposed on the first surface, and a second rib group including second ribs disposed on the second surface, the fragile portion formed in a circular shape between the first ribs and second ribs.

9. The fuel feeding apparatus according to claim 2, wherein the pipe attachment has an attachment main body and the fragile portion, the fragile portion being formed thinner than the attachment main body.

10. The fuel feeding apparatus according to claim 2, wherein the fragile portion is constructed and arranged to be a portion where the pipe attachment curves around the pipe main body, the fragile portion receiving a maximum moment when an external force is applied to the attachment member.

* * * * *